US012609120B2

(12) United States Patent
Rothschild

(10) Patent No.: US 12,609,120 B2
(45) Date of Patent: **\*Apr. 21, 2026**

(54) METHOD AND SYSTEM FOR PROVIDING ASSISTANCE FOR COGNITIVELY IMPAIRED USERS BY UTILIZING ARTIFICIAL INTELLIGENCE

(71) Applicant: Leigh M. Rothschild, Miami, FL (US)

(72) Inventor: Leigh M. Rothschild, Miami, FL (US)

(73) Assignee: Ariel Inventions, LLC, Fort Lauderdale, FL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/057,541

(22) Filed: Feb. 19, 2025

(65) Prior Publication Data

US 2025/0342833 A1     Nov. 6, 2025

Related U.S. Application Data

(63) Continuation of application No. 18/656,244, filed on May 6, 2024, now Pat. No. 12,260,863.

(51) Int. Cl.
| | |
|---|---|
| *G06F 40/35* | (2020.01) |
| *G10L 15/22* | (2006.01) |
| *G10L 25/93* | (2013.01) |

(52) U.S. Cl.
CPC .............. *G10L 15/22* (2013.01); *G10L 25/93* (2013.01)

(58) Field of Classification Search
CPC ......... G10L 15/22; G06F 16/338; G06F 40/35
See application file for complete search history.

(56) References Cited

U.S. PATENT DOCUMENTS

| | | | | |
|---|---|---|---|---|
| 8,537,980 | B2 * | 9/2013 | Frazier ................ | H04L 65/1083 |
| | | | | 379/88.16 |
| 9,491,573 | B2 * | 11/2016 | Khare ................... | G10L 19/008 |
| 11,302,320 | B2 * | 4/2022 | Deros ................... | G06Q 30/016 |
| 2020/0043479 | A1 * | 2/2020 | Mont-Reynaud ....... | G06F 40/58 |
| 2021/0256046 | A1 * | 8/2021 | Newell ............... | G10L 15/1822 |
| 2021/0352560 | A1 * | 11/2021 | Cai ................... | H04M 3/42263 |
| 2024/0160298 | A1 * | 5/2024 | Nongpiur ................ | G06F 3/017 |

FOREIGN PATENT DOCUMENTS

| | | | |
|---|---|---|---|
| JP | | 7187212 B2 * | 12/2022 |

\* cited by examiner

*Primary Examiner* — Daniel Abebe
(74) *Attorney, Agent, or Firm* — Dobbin IP Law, P.C.; Geoffrey E. Dobbin

(57) ABSTRACT

In an embodiment, the disclosure relates to a device for assisting a respondent in a conversation. The device includes a microphone configured to detect a voice input, and a transmitter communicatively coupled to a server and configured to transmit the voice input to the server. The server is to generate vectors associated with the voice input, feed the vectors associated with the voice input to an Artificial Intelligence utilizing a trained Machine Learning (ML) model, and obtain, from the trained ML model, an output corresponding to the vectors. The device further includes a receiver communicatively coupled to the server, and configured to receive from the server, the output generated by the ML model. A speaker is communicatively coupled with the receiver and is configured to generate a voice-based response based on the output, for assisting the respondent in responding to the conversation.

20 Claims, 6 Drawing Sheets

100

Server 116

Machine Learning (ML) Model 118

126

102

Communication Network 120

130

102

134A

AA

134B

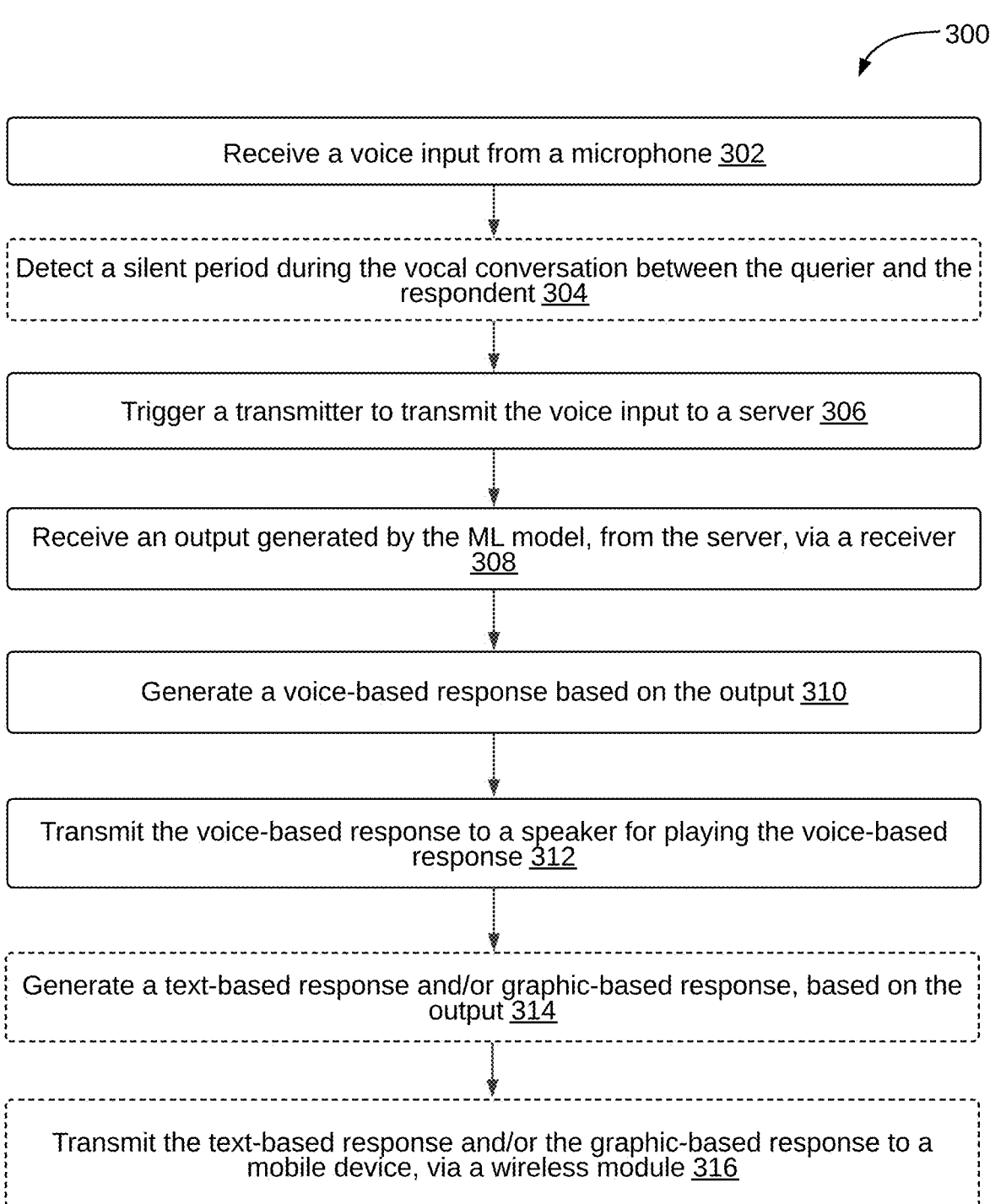

┌─ 300

| Receive a voice input from a microphone 302 |

| Detect a silent period during the vocal conversation between the querier and the respondent 304 |

| Trigger a transmitter to transmit the voice input to a server 306 |

| Receive an output generated by the ML model, from the server, via a receiver 308 |

| Generate a voice-based response based on the output 310 |

| Transmit the voice-based response to a speaker for playing the voice-based response 312 |

| Generate a text-based response and/or graphic-based response, based on the output 314 |

| Transmit the text-based response and/or the graphic-based response to a mobile device, via a wireless module 316 |

FIG. 3

METHOD AND SYSTEM FOR PROVIDING ASSISTANCE FOR COGNITIVELY IMPAIRED USERS BY UTILIZING ARTIFICIAL INTELLIGENCE

TECHNICAL FIELD

This disclosure relates generally to aiding users with cognitive disabilities, and in particular to a device, method, and system for assisting a respondent in a conversation and generating voice-assistance for the respondent.

BACKGROUND

Communication challenges faced by individuals with cognitive disabilities can vary widely, as cognitive disabilities encompass a range of conditions affecting cognitive functions such as memory, attention, problem-solving, and language skills. These challenges can impact the ability to express oneself, understand information, or recall information, and engage in effective communication. In particular, such individuals may face challenges with respect to articulating words, forming coherent sentences, or expressing their thoughts verbally. Further, communication impairments can manifest as speech disorders, language delays, or challenges in understanding and using words effectively. Furthermore, cognitive disabilities can impact social skills and the ability to engage in reciprocal communication, and the individuals may struggle with comprehending the message or queries put forward by another person (querier).

A related art in the technical field of the present subject matter is U.S. Pat. No. 10,523,614 B2 (issued on Dec. 31, 2019) that relates to a "Conversation agent", that includes a context module to determine a context of a conversation involving a first participant and a second participant. The related art addresses challenges faced by users, especially those having attentional challenges or cognitive impairments, as to thinking of a topic for a conversation, or when a conversation lags due to inattention, or other issues arising during conversations. However, the related art doesn't address the issue of assisting a user (i.e., a respondent) in responding to a conversation with another user (i.e., a querier), by leveraging Machine Learning techniques.

Therefore, there is a need for addressing the communication challenges faced by individuals with cognitive disabilities, by utilizing assistive solutions, to thereby enhance the overall quality of communication and improve the individual's ability to recall facts and express themselves and engage with others.

SUMMARY

In an embodiment, a device for assisting a respondent in a conversation is disclosed. The device may include a microphone configured to detect a voice input. The voice input may include an excerpt from a vocal conversation between a querier and the respondent. The device may further include a transmitter communicatively coupled to a server and configured to transmit the voice input to the server. The server may be configured to generate vectors associated with the voice input and feed the vectors associated with the voice input to a trained Artificial Intelligence utilizing a Machine Learning (ML) model. The server may be further configured to obtain, from the trained ML model, an output corresponding to the vectors. The output may include at least one token as a response to the conversation. The device may further include a receiver communicatively coupled to the server, and configured to receive from the server, the output generated by the ML model. The device may further include a speaker communicatively coupled with the receiver. The speaker may be configured to receive, from the receiver, the output generated by the ML model, and generate a voice-based response based on the output, for assisting the respondent in responding to the conversation.

In another embodiment, a method of assisting a respondent in a conversation is disclosed. The method may include receiving, from a microphone, a voice input. The voice input may include an excerpt from a vocal conversation between a querier and the respondent. The method may further include triggering a transmitter to transmit the voice input to a server. The server may be configured to generate vectors associated with the voice input, feed the vectors associated with the voice input to a trained Machine Learning (ML) model, and obtain, from the trained ML model, an output corresponding to the vectors. The output may include at least one token as a response to the conversation. The method may further include receiving the output generated by the ML model, from the server, and generating a voice-based response based on the output. The method may further include transmitting the voice-based response to a speaker for playing the voice-based response, for assisting the respondent in responding to the conversation.

In yet another embodiment, a method of generating voice-assistance for a respondent is disclosed. The method may include receiving from a microphone, a voice input. The voice input may include an excerpt from a speech by the respondent. The method may further include triggering a transmitter to transmit the voice input to a server. The server may be configured to generate vectors associated with the voice input, feed the vectors associated with the voice input to a trained Machine Learning (ML) model, and obtain, from the trained ML model, an output corresponding to the vectors. The output may include at least one token as a response to the excerpt from the speech. The method may further include receiving the output generated by the ML model, from the server, and generating a voice-based response based on the output. The method may further include transmitting the voice-based response to a speaker for playing the voice-based response, for providing voice-assistance to the respondent.

Further, in another embodiment, a non-transitory computer-readable medium storing computer-executable instructions for assisting a respondent in a conversation is disclosed. The computer-executable instructions are configured for receiving, from a microphone, a voice input. The voice input may include an excerpt from a vocal conversation between a querier and the respondent. The computer-executable instructions are configured for triggering a transmitter to transmit the voice input to a server. The server is to generate vectors associated with the voice input, feed the vectors associated with the voice input to a trained Artificial Intelligence utilizing a Machine Learning (ML) model, and obtain, from the trained ML model, an output corresponding to the vectors. The output may include at least one token as a response to the conversation. The computer-executable instructions are configured for receiving the output generated by the ML model, from the server, via a receiver, generating a voice-based response based on the output, and transmitting the voice-based response to a speaker for playing the voice-based response, for assisting the respondent in responding to the conversation.

The above device, methods, and non-transitory computer-readable medium provide various techniques of assisting a respondent user in responding to a conversation or providing voice assistance to the respondent. In particular, the techniques provide for capability for recognizing voice conversations and assist the respondent to communicate seamlessly with other people by analyzing the conversation, when the respondent fails to understand or respond to a conversation, by notifying or alerting the respondent in simpler terms. The techniques provide for acting as an assistant by storing key information about the respondent, such as medical information, Date of Birth, names of spouse, parents or siblings, or any other important social information. The techniques may also provide for time-based or to-do reminders, or set automatic calendar reminders (e.g., bill payment, taking medication, doctors' appointment, turning off devices, etc.). Further, the techniques provide capability to answer general queries of the user, such as 'what is their name', 'where do they live', 'blood type', or other medical information, help the user locate their car or cell phone, and provide suggestions to the user about the nearest restaurant or coffee shop, medical store, or nearest washroom, etc.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 is a flowchart of a method of assisting the respondent in a conversation, in accordance with some embodiments.

DETAILED DESCRIPTION

Non-Limiting Definitions

Figure 1A:
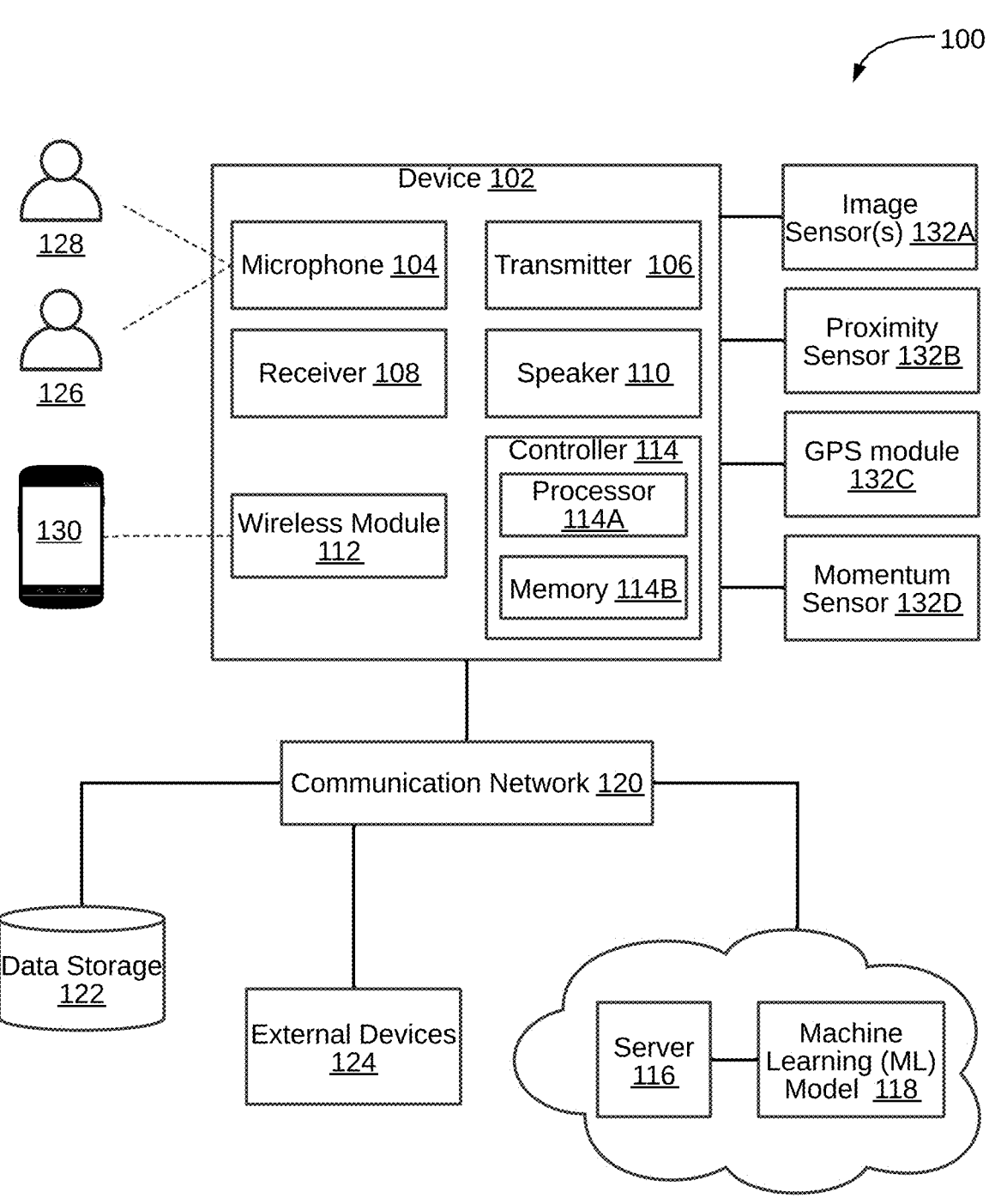
FIG. 1A is a block diagram of an exemplary system for assisting a respondent in a conversation, in accordance with some embodiments of the present disclosure.

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "respondent" may refer to a person requiring voice-assistance or assistance in responding to a conversation. In some example scenarios, the "respondent" may be suffering from a cognitive disability.

The term "querier" may refer to another person who is part of the conversation with the "respondent". For example, the "querier" may put up a query to the "respondent" during the conversation.

The term "microphone" may refer to a transducer that converts sound waves into electrical signals. The "microphone" may be one of a dynamic-type, a condenser-type, or a ribbon-type microphone.

The term "transmitter" may refer to a device that converts electrical signals into electromagnetic waves for the purpose of communication. As such, the "transmitter" may modulate a carrier signal with information, such as voice, data, or video, and transmit it.

The term "server" may refer to a computing device, for example, implemented on a Cloud network, such as 'Amazon Web Services (AWS)', 'Microsoft Azure', 'Google Cloud Platform (GCP)', etc.

The term "Machine Learning (ML) model" may refer to a computational algorithm or statistical model that is designed to learn patterns and make predictions or decisions without being explicitly programmed for the specific task.

The term "receiver" may refer to a device that captures and interprets incoming signals, converting them from their transmitted form into a usable format for further processing or display.

The term "speaker" may refer to a transducer that converts electrical signals into sound waves, allowing for the reproduction of audio.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Overview

To address the communication challenges faced by individuals with cognitive disabilities, the present subject matter discloses a method and system for assisting a respondent in a conversation and generating voice-assistance for the respondent. The present subject matter provides for a device that acts as a virtual companion to help people with cognitive impairment or who are in the early stages of cognitive decline with daily tasks that would otherwise be difficult for them. The system includes a wearable device (which may be ear-worn) with capabilities of communicating with a Machine Learning (ML) model (hosted on a Cloud), over a wireless network in real-time. The device includes a microphone that captures voice inputs, and a receiver and a transmitter to communicate with the ML model. The device may receive output from the ML model corresponding to the voice input and may play the output through a speaker.

The device may also connect with a mobile device (of the respondent) through Bluetooth or other communication channels to convey the information to the mobile device. For example, the other communication channels may include Wi-Fi, Near Field Communication (NFC), Infrared (IR) communication, and cellular (3G/4G/5G) communication. The mobile device may display the output through text. The device, therefore, acts as an interface between the user (respondent) and the cloud-hosted ML model in real-time. The communication takes place privately and the output from the ML model is communicated to the user through the ear-worn device. Further, the system may include an imaging device which may be built into the device or connected to the device. The imaging device may perform facial recognition and object recognition. As such, the imaging device may help the respondent identify a person (i.e., a querier) or an object. Further, if the respondent is unable to find the right words for describing an object (for example, a door, a table, etc.), the device can help the respondent identify the object using the imaging device.

The device has the capability to recognize voice conversations and assist the respondent in communicating seamlessly with other people by analyzing the conversation, especially when the respondent fails to understand or respond to a conversation. The device may notify or alert the respondent, for example, via a mobile device. As such, the device assists the respondent during a meeting with family, a friend, or a stranger, when the respondent is either unable to understand the context of the conversation or not able to respond within a reasonable amount of time. The device further acts as an assistant by storing key information about the respondent, such as medical information, Date of Birth, names of spouse, parents, or siblings, or any other important information associated with the user or the user's family or assistants who wish to input into the database. The device can also be programmed for time-based or to-do reminders, or set automatic calendar reminders (e.g., bill payment, taking medication, doctors' appointment, turning off devices, etc.). The device responds by providing answers to pre-stored questions when asked. Further, the device has the capability to answer general queries of the user, such as 'what is their name', 'where do they live', 'blood type', or other medical information, help the user locate their car or cell phone, etc. The device may further provide suggestions to the user about the nearest restaurant or coffee shop, medical store, or nearest washroom. In another embodiment, a location device (e.g., GPS module) may be included in the device or connected through communications channels to the device.

Assisting a respondent in a conversation is a technical solution to long-standing challenges faced by individuals with cognitive disabilities who are not able to express themselves, understand information, and engage in effective communication. The technical solutions afforded by the present subject matter, that include detecting a voice input and generating a voice-based or a text-based response corresponding to the voice input, are not abstract ideas because of multiple reasons. Assisting a respondent in a conversation is not an abstract idea because it is not merely an idea itself (e.g., it cannot be performed mentally or using pen and paper). Assisting a respondent in a conversation is not an abstract idea because it is not a fundamental economic practice (e.g., is not merely creating a contractual relationship, hedging, mitigating a settlement risk, etc.). Assisting a respondent in a conversation is not an abstract idea, as it is not a method of organizing human activity (e.g., managing a game of bingo). Assisting a respondent in a conversation is not an abstract idea because the methods and systems are not simply a mathematical relationship/formula but instead include capturing real-time (voice) data using microphone, generating output using Machine Learning models, generating voice-based responses via a speaker.

Assisting a respondent in a conversation is not an abstract idea because it assists the respondent in communicating seamlessly with other people by analyzing the conversation, when the respondent fails to understand or respond to a conversation, by notifying or alerting the respondent in simpler terms.

Assisting a respondent in a conversation is not an abstract idea because the disclosure requires one or more hardware components such as microphone, transmitter, receiver, speaker, wireless module, imaging device, memory, and software components such as a controller, etc. The hardware and software components work in tandem with each other to assist respondent in responding to a conversation.

Assisting a respondent in a conversation is not an abstract idea because the disclosure allows for significant improvement to the technical fields of affording assistance to users with cognitive disabilities.

The disclosure clearly differentiates over the prior art by incorporating one or more features such as detecting a voice input using a microphone, obtaining output from a trained ML model corresponding to the voice input, and generating a voice-based response based on the output using a speaker, for assisting the respondent in responding to the conversation. Therefore, the disclosure advances the art and provides a useful and important solution to those with cognitive difficulties.

Exemplary System

Referring now to FIG. 1A, a block diagram of an exemplary system 100 for assisting a respondent in a conversation is illustrated, in accordance with some embodiments of the present disclosure. The system 100 may implement a device 102 for assisting the respondent in the conversation. Further, the system 100 may include a data storage 122. In some embodiments, the data storage 122 may store at least some of the personal data related to the respondent. The device 102 may be a computing device having data processing capability. In particular, the device 102 may have the capability of assisting the respondent in a conversation. The device 102, in some embodiments, may be an ear-worn device. Alternatively, the device 102 may be stand-alone device (for example, similar to a smart speaker such as the Alexa speakers, or the Google Assistant speakers).

Additionally, the device 102 may be communicatively coupled to an external device 124 for sending and receiving various data. Examples of the external device 124 may include, but are not limited to, a remote server, digital devices, and a computer system. The device 102 may connect with the external device 124 and the data storage 122 over a communication network 120. The device 102 may connect with external device 124 and the data storage 122 via a wired connection, for example via Universal Serial Bus (USB). A computing device, a smartphone, a mobile device, a laptop, a smartwatch, a personal digital assistant (PDA), an e-reader, and a tablet are all examples of external devices 124.

The system 100 may further include a server 116 implemented, for example, on a Cloud network. The system 100 may further implement a Machine Learning (ML) model 118. Both the server 116 and the ML model 118 may be implemented on the Cloud network. As will be understood by those skilled in the art, the ML model 118 may implement Artificial Intelligence (AI) to create techniques that allow learning from data and improving performance on a given task without being explicitly programmed. As such, the ML model 118 may be trained on data to recognize patterns in data and make predictions or decisions based on those patterns.

In some embodiments, the device 102 may include a microphone 104, a transmitter 106, receiver 108, and a speaker 110. In some embodiments, the device 102 may additionally include a wireless module 112 and a controller 114. Further, in some embodiments, the receiver 108 and the transmitter 106 may be implemented as a single transceiver. The device 102 may be configured to perform one or more functionalities that may include receiving, from the microphone 104, a voice input. The voice input may include an excerpt from a vocal conversation between a querier and the respondent. The one or more functionalities may further include triggering the transmitter 106 to transmit the voice input to the server 116. The server 116 may be configured to generate vectors associated with the voice input, feed the vectors associated with the voice input to the trained ML model 118, and obtain, from the trained ML model 118, an output corresponding to the vectors. The output may include at least one token as a response to the conversation. The one or more functionalities may further include receiving the output generated by the ML model 118, from the server 116, via the receiver 108. The one or more functionalities may further include generating a voice-based response based on the output and transmitting the voice-based response to the speaker 110 for playing the voice-based response, for assisting the respondent in responding to the conversation.

To perform the above functionalities, the device 102 may include the controller 114. The controller 114 may include a processor 114A and a memory 114B. The memory 114B may be communicatively coupled to the processor 114A. The memory 114B stores a plurality of instructions, which upon execution by the processor 114A, cause the processor 114A to perform the above functionalities.

In some embodiments, the device 102 may be implemented as an ear-worn device. As such, the device 102 may be worn by the user (also, referred to as 'respondent' in this disclosure) in the ear, in the same way as an earphone, a headphone, or a hearing aid. However, in some alternative embodiments, the device 102 may be implemented as a stand-alone in the same way as a smart speaker.

The microphone 104 of the device 102 may be configured to detect a voice input, for example, during a vocal conversation between the respondent 126 and a querier 128, or during a speech by the respondent 126 (i.e., without the presence of the querier 128). The microphone 104, as will be appreciated by a person skilled in the art, may be a transducer that converts sound waves into electrical signals. The microphone 104 may be one of a dynamic-type, a condenser-type, or a ribbon-type microphone. The voice input may include an excerpt from the vocal conversation between the querier 128 and the respondent 126. For example, the querier 128 may be a waiter at a restaurant, and the respondent 126 may be a customer trying to place an order for food. Assuming the querier 128 asks a query to the respondent 126: "give me your order". However, due to cognitive disability, the respondent 126 may not be able to comprehend the conversation with the querier 128. In the above scenario, the microphone 104 may capture at least an excerpt from the vocal conversation between the querier 128 and the respondent 126. The voice input may be processed with automatic noise cancelling technology (ANC) known in the art, to allow the recipient to better hear the voice input from the person speaking to the respondent 126.

The transmitter 106, as will be appreciated, may convert electrical signals into electromagnetic waves for the purpose of communication. Further, the transmitter 106 may modulate a carrier signal with information, such as voice, data, or video, and transmit it. The transmitter 106 may, therefore, transmit the voice input from the device 102 to the server 116, over a communication network 120. For example, the communication network 120 may be a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, satellite, or any other appropriate network required for communication between the device 102 and the server 116.

The server 116 may be a computing device, for example, implemented on a Cloud network, such as 'Amazon Web Services (AWS)', 'Microsoft Azure', 'Google Cloud Platform (GCP)', etc. The server 116 may further implement or communicate with the ML model 118. As will be understood, the ML model 118 may be trained on data to make predictions or decisions without being explicitly programmed for the task. The server 116 may work in tandem with the ML model 118 for performing one or more operations. In some embodiments, the server 116 may receive the voice input from the device 102 via the transmitter 106. Further, the server 116 may generate vectors associated with the voice input, and feed the vectors associated with the voice input to the trained ML model 118. The ML model 118 may be trained over training data to generate output corresponding to the voice input. The output may include at least one token as a response to the conversation.

In some embodiments, the output obtained from the ML model 118 may be a text-based output. In other words, the ML model 118 may be trained on text-based data. Therefore, the voice input (received from the microphone 104) may be first converted into text format. Further, vectors may be generated from corresponding to the voice input, for feeding to the ML model 118. In alternate embodiments, the output obtained from the ML model 118 may be a voice-based output. As such, the ML model 118 may be trained on voice-based data. Therefore, the voice input (received from the microphone 104) may be used as it is to generate vectors for feeding to the ML model 118.

For example, in the above example, the output may include a response to the query of the querier 128 (the waiter): "give me your order". Further, it should be noted that the output obtained from the ML model 118 may include a rephrasing of the excerpt from the vocal conversation between the querier 128 and the respondent 126. As such, in the above example, the output may be a simpler reworded instruction, such as: "the man (or woman) would like you to tell them what food you are ordering". Alternatively, the output obtained from the ML model 118 may include an answer to a query associated with the vocal conversation between the querier 128 and the respondent 126. As such, the output may be an answer which the ML model 118 may derive based on personal data and preferences of the respondent 126. For example, the personal data of the respondent 126 may include spouse name; parents' names; siblings' names; respondent's: name, Date of Birth, Social Security Number, home address, religion, doctor's (primary and ancillary) information, medical information, education background, etc. The personal data of the respondent 126 may be pre-stored in the data storage 122 or the ML model 118 may be trained on it. In the above example, the output may, therefore, include a name of a dish (e.g., "pasta", or "pizza") as a response to the query of the querier 128. The user's food order may be processed by the ML model 118 based on the past orders or specific preferences of the user. The server 116 may, thus, obtain from the trained ML model 118, the output corresponding to the vectors.

The receiver 108 may be communicatively coupled to the server 116 via the communication network 120 and may be configured to receive from the server 116, the output generated by the ML model 118. As will be understood, the receiver 108 may capture and interpret incoming signals, converting them from their transmitted form into a usable format for further processing or display. It should be noted that, in some embodiments, the transmitter 106 and the receiver 108 may be implemented as a single transceiver device that may be configured to perform the functions of both the transmitter 106 and the receiver 108.

The speaker 110 may be communicatively coupled with the receiver 108 and may be configured to receive the output generated by the ML model 118, via the receiver 108. The speaker 110, as will be understood, may be a transducer that converts electrical signals into sound waves, allowing for the reproduction of audio. The speaker 110 may be further configured to generate a voice-based response based on the output, for assisting the respondent 126 in responding to the conversation. In other words, the speaker 110 may generate the voice-based response and play that voice-based response, so as to be audible to the respondent 126. The voice-based response may enable the respondent 126 to respond to the conversation. In the above example, the voice-based response (i.e., "the man/woman would like you to tell them what food you are ordering") may enable the respondent 126 to better understand the query of the querier 128, or the voice-based response (i.e., "pasta", or "pizza, etc.") may enable the respondent 126 to provide an answer to the query of the querier 128.

In some embodiments, the device 102 may further include the wireless module 112. For example, the wireless module 112 may be based on Bluetooth technology and may be configured to communicate with a mobile device 130, such as a smartphone of the respondent 126. In other example implementations, the wireless module 112 may be based on Wi-Fi, Zigbee, Near Field Communication (NFC), Radio-Frequency Identification (RFID), Ultra-Wideband (UWB), Infrared (IR), etc. The wireless module 112 may be configured to receive, from the receiver 108, the output generated by the ML model 118. The wireless module 112 may be further configured to transmit the output to the mobile device 130. The mobile device 130 may be configured to generate and display a text-based response based on the output for assisting the respondent 126 in responding to the conversation. In other words, while the speaker 110 may provide a voice-based response to the respondent 126, the mobile device 130 may (additionally or alternatively) generate and provide a text-based response to the respondent 126. To this end, the mobile device 130 may have an application pre-installed on it for coordinating with the wireless module 112, or the mobile device 130 may be able to coordinate with the wireless module 112 via a web-based browser. The respondent 126 may read the text-based response from the screen of the mobile device 130, and accordingly respond to the query of the querier 128.

As mentioned above, to enable the device 102 to perform the above functionalities, the device 102 may include the controller 114. In addition to the above functionalities, the controller 114 may be further configured to detect whether the device 102 is required to assist the respondent 126 in responding to the conversation or not. To this end, the controller 114 may be communicatively coupled to the microphone 104 and the transmitter 106. The controller 114 may be configured to fetch the voice input from the microphone 104. Further, the controller 114 may be configured to detect a silent period during the vocal conversation between the querier 128 and the respondent 126. The silent period may be of a predetermined time period. In other words, the controller 114 may detect the silent period and then compare the time period of the silent period with a threshold time period, to thereby detect whether the silent period is greater than or less than the threshold time period. It should be noted that a long silent period may indicate that the respondent 126 is unable to respond to the conversation with the querier 128, and therefore may require assistance. As such, the controller 114, upon detecting the silent period, may wait until the elapsing of the threshold time period before determining that the respondent 126 requires assistance. When the controller 114 determines that the respondent 126 requires assistance, the controller 114 may trigger the transmitter 106 to transmit the voice input to the server 116.

In some embodiments, the system 100 may further include an image sensor 132A. In some embodiments, multiple image sensors 132A may be positioned to capture images from various different viewing angles. The image sensor 132A, for example, may be inbuilt within the device 102. Alternatively, as shown in FIG. 1A, the image sensor 132A may be external to the device 102, and the device 102 may be communicatively coupled with the imaging device 132A. For example, the image sensor 132A may be a Charge-Coupled Device (CCD)-based camera. The image sensor(s) 132A may be communicatively coupled with the controller 114. The image sensor(s) 132A may obtain one or more images during the conversation between the querier 128 and the respondent 126. The controller 114 may be configured to receive the one or more images from the image sensor(s) 132A. Further, the controller 114 may be configured to determine at least one of: an identity of the querier 128, or an identification of an object captured in the one or more images. As such, facial recognition may be performed using the ML model 118 or using data pre-stored in the data storage 122, to determine the identity of the querier 128. Further, object recognition may be performed using the ML model 118 or using data pre-stored in the data storage 122, to determine the identity of the objects captured in the one or more images. When the respondent 126 is unable to find the right words for describing an object (for example, a door, a table, etc.), the device 102 may determine the identity of the object and may provide the identity to the user via audio or text input, and therefore, help the respondent 126 identify the object.

In some embodiments, the system 100 may additionally include a proximity sensor 132B, a GPS module 132C, and a momentum sensor 132D. The proximity sensor 132B, the GPS module 132C, and the momentum sensor 132D may be inbuilt within the device 102. Alternatively, as shown in FIG. 1A, the proximity sensor 132B, the GPS module 132C, and the momentum sensor 132D may be external to the device 102, and the device 102 may be communicatively coupled with the proximity sensor 132B, the GPS module 132C, and the momentum sensor 132D. For example, the proximity sensor 132B may detect the presence or absence of nearby objects or individuals without physical contact, thereby assisting the user. In particular, the proximity sensor 132B may enable the user to detect hand movements or gestures within a certain range, to assist the user to interpret specific gestures as commands for communication devices, such as tablets or smartphones. The proximity sensor 132B may further help the user detect when they are in close proximity to a designated caregiver or family member. This can further trigger automatic alerts or notifications, prompting the caregiver to check in or initiate communication, thereby providing reassurance and support to the older individual. The GPS module 132C may utilize global positioning system technology to accurately determine the user's location, ensuring their safety and security, particularly for those prone to wandering or getting lost. By continuously tracking the user's location in real-time, the GPS module 132C may enable caregivers or family members to monitor their whereabouts remotely. In case the user wanders outside of a predefined safe zone or encounters an emergency situation, the GPS module 132C may trigger automatic alerts, notifying caregivers or emergency services and facilitating prompt assistance. The momentum sensor 132D (also known as motion sensor or accelerometer) may capture and analyze gestures and movements of the other persons in the vicinity, to enable interpretation of specific gestures. Further, the momentum sensor 132D may track movements, activity levels, and even vital signs, providing valuable insights into the user's health and well-being. By monitoring changes in movement patterns or detecting falls, the momentum sensor 132D may trigger automatic alerts to caregivers or emergency services, ensuring timely assistance in case of an emergency.

Figures 1B, 1C:
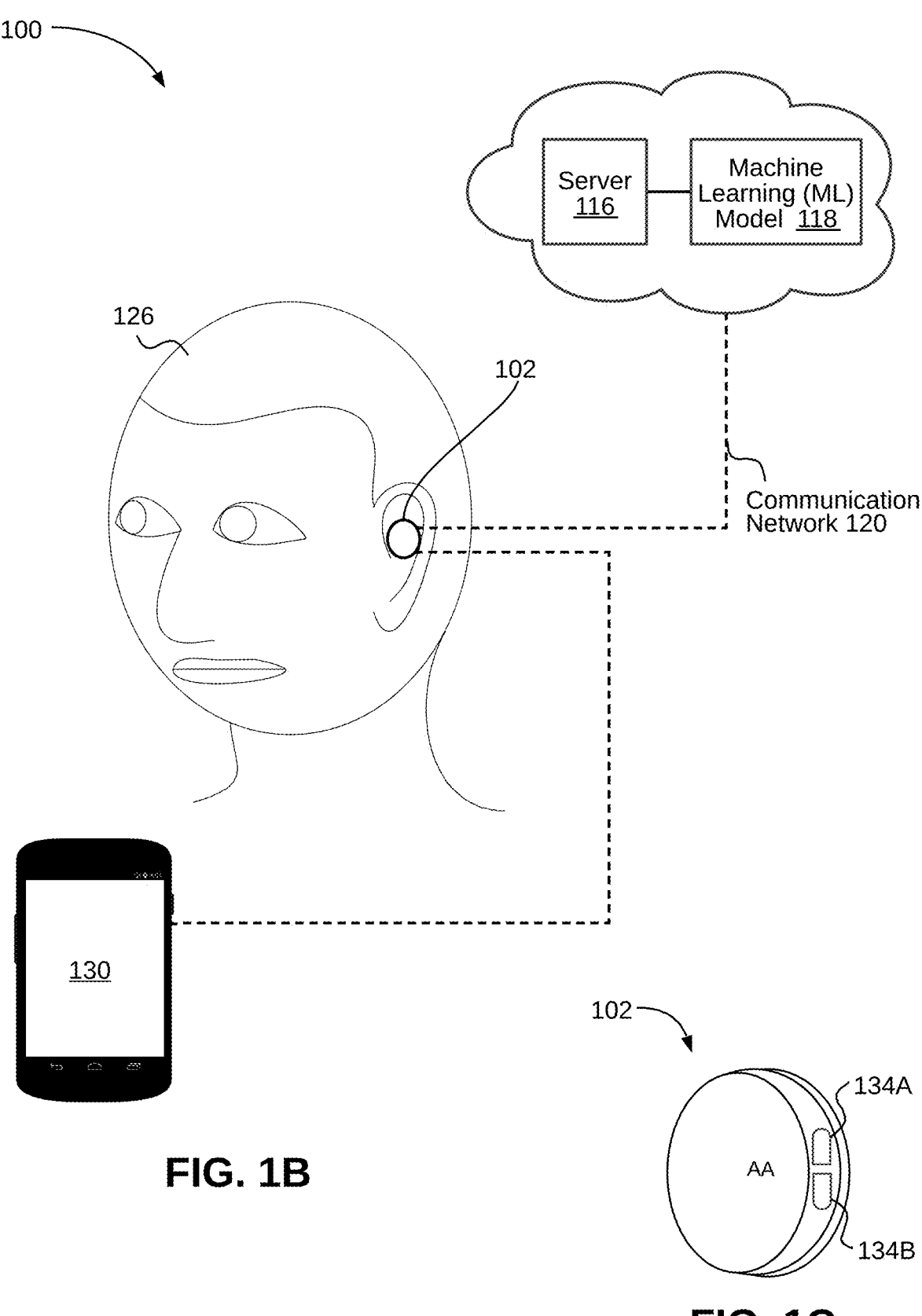
FIG. 1B is another block diagram of the exemplary system of FIG. 1A for assisting the respondent in a conversation, in accordance with some embodiments.
FIG. 1C is a magnified schematic view of the device of FIG. 1B, in accordance with some embodiments.

Referring now to FIG. 1B, another block diagram representation of the exemplary system 100 for assisting the respondent 126 in a conversation is illustrated, in accordance with some embodiments. The system 100 may implement the device 102 for assisting the respondent 126 in the conversation. As shown in FIG. 1B, the device 102 may be an ear-worn device. It should be noted that the representation of FIG. 1B is merely exemplary, and the device 102 may be configured in any other shape and size as well (for example, as an over-ear headphone, on-ear headphone, earbud, etc.). The system 100 may further include the server 116 and the ML model 118, both, for example, implemented 118 over a Cloud. The device 102 may include the microphone 104, a transmitter 106, receiver 108, and a speaker 110 (as shown in FIG. 1A). Further, the device 102 may additionally include the wireless module 112 and the controller 114 (as shown in FIG. 1A). The microphone 104 of the device 102 may detect a voice input, for example, during a vocal conversation between the respondent 126 and the querier 128, or during a speech by the respondent 126. The transmitter 106 may transmit the voice input from the device 102 to the server 116, over the communication network 120. The server 116 may receive the voice input from the device 102 via the transmitter 106, generate vectors associated with the voice input, and feed the vectors associated with the voice input to the trained ML model 118. The ML model 118 may be trained over training data to generate output corresponding to the voice input. The receiver 108 of the device 102 may receive the output generated by the ML model 118, from the server 116. The speaker 110 may receive the output generated by the ML model 118 via the receiver 108 and generate a voice-based response based on the output. The voice-based response may be played into the ear of the respondent 126 for assisting the respondent 126 in responding to the conversation. Further, the wireless module 112 may communicate with the mobile device 130 (such as a smartphone of the respondent 126). The wireless module 112 may receive, from the receiver 108, the output generated by the ML model 118, and transmit the output to the mobile device 130. The mobile device 130 may generate and display a text-based or graphical response based on the output for assisting the respondent 126 in responding to the conversation.

Referring now to FIG. 1C, a magnified schematic view of the device 102 of FIG. 1B is illustrated, in accordance with some embodiments. In some embodiments, the device 102 may include a set of volume buttons-a volume up button 134A and a volume up down button 134B. As will be understood, the volume up button 134A and a volume up down button 134B may be used by the user to increase or decrease the volume level of the audio generated by the device 102.

Figure 2:
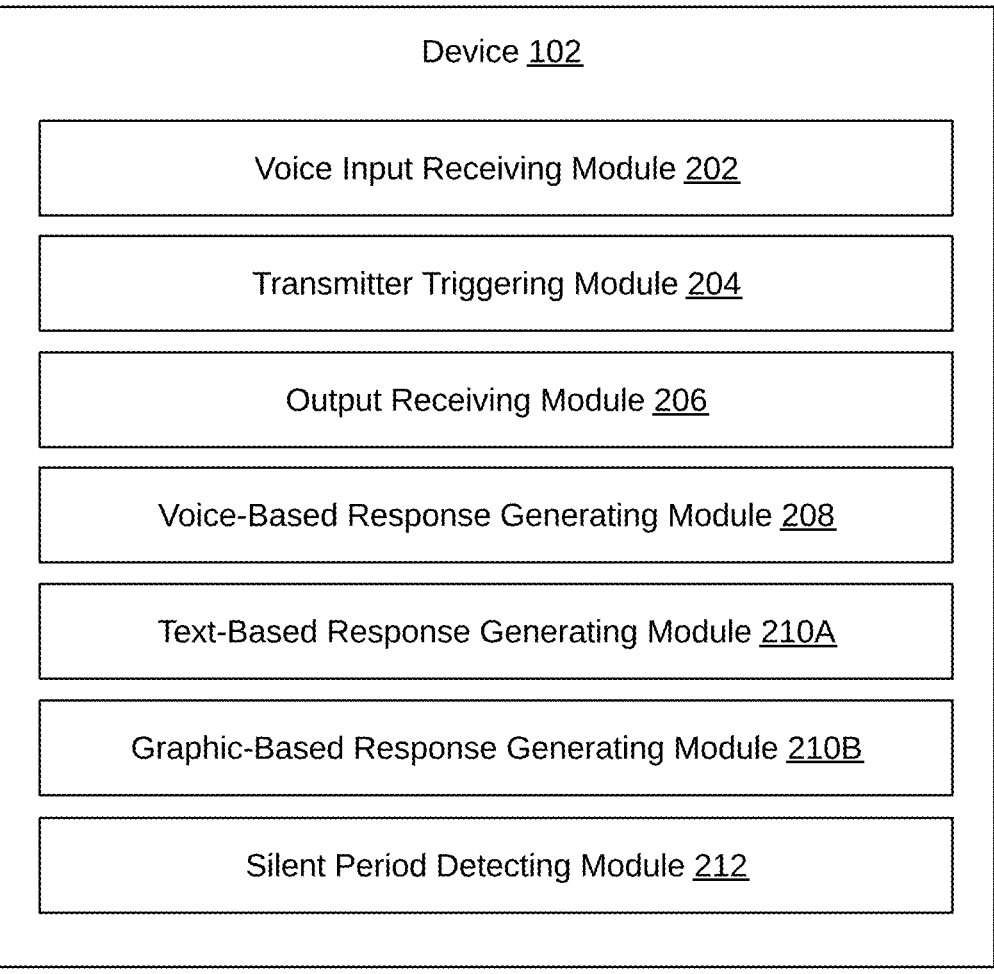
FIG. 2 is a block diagram of a device of FIG. 1 showing one or more modules, in accordance with some embodiments.

Referring now to FIG. 2, a block diagram of the device 102 showing one or more modules is illustrated, in accordance with some embodiments. In some embodiments, the device 102 may include a voice input receiving module 202, a transmitter triggering module 204, an output receiving module 206, a voice-based response generating module 208, a text-based response generating module 210A, a graphic-based response generating module 210B, and a silent period detecting module 212.

As mentioned above, the microphone 104 of the device 102 may be configured to detect a voice input, for example, during a vocal conversation between the respondent 126 and a querier 128, or during a speech by the respondent (i.e., without the presence of the querier). The voice input may include an excerpt from the vocal conversation between the querier 128 and the respondent 126. The voice input receiving module 202 may be configured to receive, from the microphone 104, the voice input. In some embodiments, the device 102 may implement automatic noise cancelling to enhance the quality of the audio played in the user's ear. As will be understood, noise cancelling reduces unwanted ambient noise in various environments, enhancing the quality of sound and improving the overall listening experience. For example, the noise cancelling may work by using microphones to detect external noise and then generating sound waves that are the exact opposite (anti-noise) to cancel out the unwanted noise.

The transmitter triggering module 204 may be configured to trigger the transmitter 106 to transmit the voice input to the server 116. In some embodiments, before the transmitter triggering module 204 triggers the transmitter 106 to transmit the voice input to the server 116, the silent period detecting module 212 may detect a silent period during the vocal conversation between the querier 128 and the respondent 126. To this end, the silent period detecting module 212 may fetch the voice input from the microphone 104, and then compare the time period of the silent period with the threshold time period, to thereby detect whether the silent period is greater than or less than the threshold time period. As mentioned above, a long silent period may indicate that the respondent 126 is unable to respond to the conversation with the querier 128, and therefore may require assistance. As such, the silent period detecting module 212, upon detecting the silent period, may wait until the elapsing of the threshold time period before determining that the respondent 126 requires assistance. When the silent period detecting module 212 determines that the respondent 126 requires assistance, the silent period detecting module 212 may coordinate with the transmitter triggering module 204 to pass on a corresponding signal. The transmitter triggering module 204 may then trigger the transmitter 106 to transmit the voice input to the server 116.

The server 116 may implement or communicate with the ML model 118. The server 116 may receive the voice input from the transmitter 106, generate vectors associated with the voice input, and feed the vectors associated with the voice input to the trained ML model 118. The ML model 118 may be trained over training data to generate output corresponding to the voice input. The output may include at least one token as a response to the conversation. The output obtained from the ML model 118 may be a text-based output or a voice-based output. The output may include a rephrasing of the excerpt from the vocal conversation between the querier 128 and the respondent 126, or an answer to a query associated with the vocal conversation between the querier 128 and the respondent 126. The receiver 108 may be communicatively coupled to the server 116 and configured to receive from the server 116, the output generated by the ML model 118.

The output receiving module 206 may be configured to receive the output generated by the ML model 118 from the server 116, via the receiver 108. The voice-based response generating module 208 may be configured to generate a voice-based response based on the output. The voice-based response generating module 208 may receive, from the receiver 108, the output generated by the ML model 118. The voice-based response generating module 208 may generate a voice-based response based on the output, for assisting the respondent 126 in responding to the conversation. Further, the voice-based response generating module 208 may transmit the voice-based response to the speaker 110, to cause the speaker 110 to play the voice-based response, so as to be audible to the respondent 126. The voice-based response is intended to enable the respondent 126 to respond to the conversation.

Additionally, in some embodiments, the text-based response generating module 210A may generate a text-based response based on the output for assisting the respondent 126 in responding to the conversation. The text-based response generating module 210A may further transmit the text-based response to the mobile device 130, via the wireless module 112. The wireless module 112 may transmit the output to the mobile device 130. The mobile device 130 may be configured to display the text-based response for assisting the respondent in responding to the conversation. The respondent 126 may read the text-based response from the screen of the mobile device 130, and accordingly respond to the query of the querier 128.

In some embodiments, the graphic-based response generating module 210B may generate a map or graphic-based rendering on a smartphone for guiding the user elderly individual's home. For example, the graphic-based response generating module 210B may use GPS technology and mapping software to create a visual representation of the route to the individual's home, along with relevant landmarks, points of interest, and directions. As such, the user may easily access the map or graphic rendering on their smartphones, allowing them to navigate with confidence and independence.

Exemplary Method Flowchart

Referring to FIG. 3, a flowchart of a method 300 of assisting the respondent 126 in a conversation is illustrated, in accordance with some embodiments. The method 300, for example, may be performed by the device 102 or, in particular, by the controller 114.

At 302, a voice input may be received from the microphone 104. The voice input may include an excerpt from a vocal conversation between the querier 128 and the respondent 126. The microphone 104 of the device 102 may detect a voice input, for example, during a vocal conversation between the respondent 126 and a querier 128, or during a speech by the respondent 126 (i.e., without the presence of the querier 128). The voice input may include an excerpt from the vocal conversation between the querier 128 and the respondent 126. The voice input receiving module 202 may receive the voice input from the microphone 104.

In some embodiments, at 304, a silent period during the vocal conversation between the querier 128 and the respondent 126 may be detected. The silent period may be of a predetermined time period. The silent period detecting module 212 may detect the silent period during the vocal conversation between the querier 128 and the respondent 126. The silent period detecting module 212 may fetch the voice input from the microphone 104, and then compare the time period of the silent period with the threshold time period, to thereby detect whether the silent period is greater than or less than the threshold time period. A long silent period may indicate that the respondent 126 is unable to respond to the conversation with the querier 128, and therefore may require assistance. As such, the silent period detecting module 212, upon detecting the silent period, may wait until the elapsing of the threshold time period before determining that the respondent 126 requires assistance. When it is determined that the respondent 126 requires assistance, the silent period detecting module 212 may coordinate with the transmitter triggering module 204 to pass on a corresponding signal.

At 306, the transmitter 106 may be triggered to transmit the voice input to the server 116. For example, the transmitter triggering module 204 may trigger the transmitter 106 to transmit the voice input to the server 116. Once the server 116 receives the voice input, the server may generate vectors associated with the voice input, and feed the vectors associated with the voice input to the trained ML model 118. Further, the server 116 may obtain, from the trained ML model 118, the output corresponding to the vectors. The output may include at least one token as a response to the conversation. The ML model 118 may be trained over training data to generate output corresponding to the voice input. The output obtained from the ML model 118 may be a text-based output or a voice-based output. For example, the output may include a rephrasing of the excerpt from the vocal conversation between the querier 128 and the respondent 126, or an answer to a query associated with the vocal conversation between the querier 128 and the respondent 126.

At 308, the output generated by the ML model 118 may be received from the server 116, via the receiver 108. The receiver 108 may be communicatively coupled to the server 116 and configured to receive from the server 116, the output generated by the ML model 118.

At 310, a voice-based response may be generated based on the output. The voice-based response generating module 208 may be configured to generate the voice-based response based on the output. In some embodiments, voice-based response may be generated in a preferred language of the user. To this end, a user selection of the preferred language may be initially recorded, and accordingly the voice-based response may be generated in that preferred language.

At 312, the voice-based response may be transmitted to the speaker 110 for playing the voice-based response, for assisting the respondent in responding to the conversation. The voice-based response generating module 208 may transmit the voice-based response to the speaker 110, to cause the speaker 110 to play the voice-based response, so as to be audible to the respondent 126.

Additionally, or alternatively, at 314, a text-based response and/or the graphic-based response may be generated based on the output for assisting the respondent in responding to the conversation. At 316, the text-based response and/or the graphic-based response to a mobile device, via a wireless module. In particular, the text-based response generating module 210A may transmit the text-based response to the mobile device 130, via the wireless module 112. Further, the graphic-based response generating module 210B may transmit the graphic-based response to the mobile device 130, via the wireless module 112. The mobile device 130 may be configured to display the text-based response for assisting the respondent in responding to the conversation. The respondent 126 may read the text-based response from the screen of the mobile device 130, and accordingly respond to the query of the querier 128.

Figure 4:
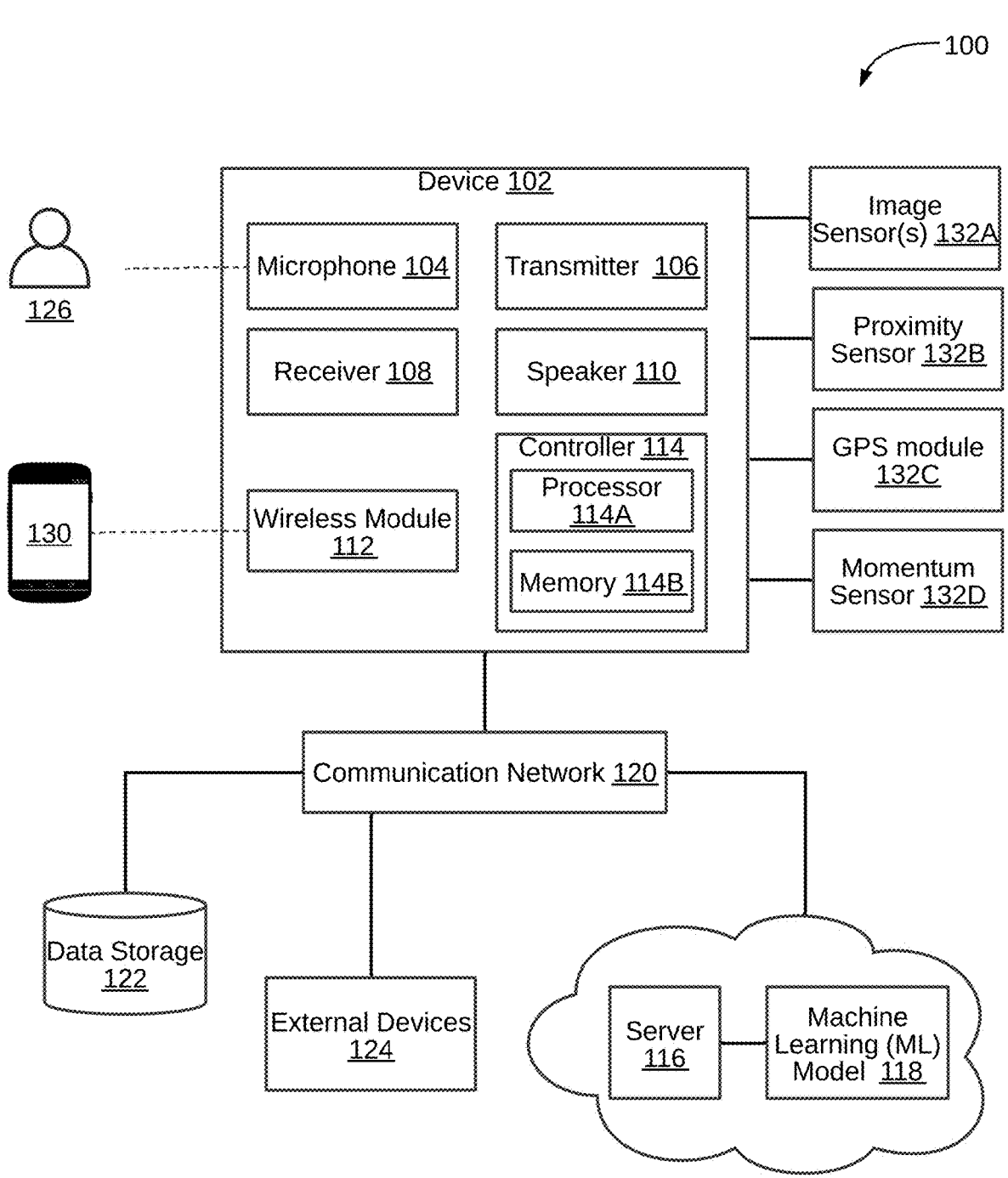
FIG. 4 is a block diagram of an exemplary system for generating voice-assistance for the respondent, in accordance with some embodiments.

It should be noted that the system 100 and the device 102 may be configured for another functionality of generating voice-assistance for the respondent 126 i.e., when the respondent 126 is not involved in a conversation with the querier 128. For example, the respondent 126 may ask a question (i.e., a voice input) which may be picked by the device 102, and the device 102 may generate a voice-based or text-based or graphic-based response corresponding to the question. The above application of the system 100 and the device 102 is further explained in conjunction with FIG. 4.
Exemplary System Referring now to FIG. 4, a block diagram of the exemplary system 100 for generating voice-assistance for the respondent 126 is illustrated, in accordance with some embodiments of the present disclosure. The system 100 may implement the device 102 for generating voice-assistance for the respondent 126. The device 102 may be a computing device having data processing capability, and in particular, the device 102 may have the capability of generating voice-assistance for the respondent 126. The device 102, in some embodiments, may be an ear-worn device. Alternatively, the device 102 may be a stand-alone device (for example, similar to a smart speaker). As already mentioned above, the system 100 may include the data storage 122. Additionally, the device 102 may be communicatively coupled to an external device 124 for sending and receiving various data. The device 102 may connect to the external device 124 and the data storage 122 over a communication network 120. The system 100 may further include the server 116. The system 100 may further implement the ML model 118. Both the server 116 and the ML model 118 may be implemented over the Cloud. The device 102 may include the microphone 104, the receiver 108, the transmitter 106, and the speaker 110. In some embodiments, the device 102 may additionally include the wireless module 112 and the controller 114.

The device 102 may be configured to perform one or more functionalities that may include receiving a voice input from the microphone 104. The voice input may include an excerpt from a speech by the respondent 126. The device 102 may further trigger the transmitter 106 to transmit the voice input to the server 116. The server 116 may generate vectors associated with the voice input, and feed the vectors associated with the voice input to the trained ML model 118. The server 116 may further obtain, from the trained ML model 118, an output corresponding to the vectors. The output may include at least one token as a response to the excerpt from the speech. The device 102 may further receive the output generated by the ML model 118, from the server 116, via the receiver 108. The device 102 may further generate a voice-based response based on the output, and transmit the voice-based response to the speaker 110 for playing the voice-based response, for providing voice-assistance to the respondent 126.

To perform the above functionalities, the device 102 may include the controller 114. The controller 114 may include the processor 114A and the memory 114B communicatively coupled to the processor 114A. The memory 114B stores a plurality of instructions, which upon execution by the processor 114A, cause the processor 114A to perform the above functionalities.

The microphone 104 of the device 102 may be configured to detect a voice input, for example, during a speech by the respondent 126 (i.e., without the presence of the querier 128). For example, the respondent 126, during the speech, may provide a query relating to getting aid in: 'getting home', 'remembering information related to family members', 'time to have diabetes medicine', 'today's date and day,' etc. Some other example queries may relate to getting aid in: 'automatic time-based reminder', 'daily to-do list', 'turning off stove' etc. However, due to cognitive disability, the respondent 126 may not be able to remember the above information and may require the device 102 to provide that information, for example, when carrying out outdoor activities (e.g., grocery shopping, driving, etc.). In the above scenario, the microphone 104 may capture at least an excerpt from the speech by the respondent 126.

The transmitter 106 may transmit the voice input from the device 102 to the server 116, over the communication network 120. The server 116 may receive the voice input from the device 102 via the transmitter 106. Further, the server 116 may generate vectors associated with the voice input, and feed the vectors associated with the voice input to the trained ML model 118. The ML model 118 may be trained over training data to generate output corresponding to the voice input. The output may include at least one token as a response to the speech.

In some embodiments, the output obtained from the ML model 118 may be a text-based output. In other words, the ML model 118 may be trained on text-based data. Therefore, the voice input (received from the microphone 104) may be first converted into text format. Further, vectors may be generated corresponding to the voice input that may be fed to the ML model 118. In alternate embodiments, the output obtained from the ML model 118 may be a voice-based output. As such, the ML model 118 may be trained on voice-based data. Therefore, the voice input (received from the microphone 104) may be used as it is to generate vectors for feeding to the ML model 118.

For example, in the above example, the output may include a response to the query associated with the speech. The output obtained from the ML model 118 may include an answer to the query associated with the speech by the respondent 126. As such, the output may be an answer that the ML model 118 may derive based on personal data and preferences of the respondent 126. For example, the personal data of the respondent 126 may include spouse name; parents' names; siblings' names; respondent's: name, Date of Birth, Social Security Number, home address, religion, doctor's (primary and ancillary) information, medical information, education background, and general and specific information on the user's life. The personal data of the respondent 126 may be pre-stored in the data storage 122 or the ML model 118 may be trained on it. In the above example, the output may, therefore, include the name of a dish (e.g. "pasta", or "pizza") as a response to the query of the querier 128. The server 116 may, thus, obtain from the trained ML model 118, the output corresponding to the vectors. The receiver 108 may be communicatively coupled to the server 116 via the communication network 120 and may be configured to receive from the server 116, the output generated by the ML model 118.

The speaker 110 may be communicatively coupled with the receiver 108 and may be configured to receive the output generated by the ML model 118, via the receiver 108. The speaker 110 may be further configured to generate a voice-based response based on the output, for providing voice assistance to the respondent 126. In other words, the speaker 110 may generate the voice-based response and play that voice-based response, so as to be audible to the respondent 126. The voice-based response may enable the respondent 126 to get an answer to their query.

The device 102 may further include the wireless module 112 which may be configured to communicate with the mobile device 130, such as a smartphone of the respondent 126. The wireless module 112 may be configured to receive, from the receiver 108, the output generated by the ML model 118, and transmit the output to the mobile device 130. The mobile device 130 may be configured to generate and display a text-based response based on the output for providing voice assistance to the respondent 126. As such, while the speaker 110 may provide a voice-based response to the respondent 126, the mobile device 130 may (additionally or alternatively) generate and provide a text-based response to the respondent 126. To this end, the mobile device 130 may have an application pre-installed on it for coordinating with the wireless module 112, or the mobile device 130 may be able to coordinate with the wireless module 112 via a web-based browser. The respondent 126 may read the text-based response from the screen of the mobile device 130.

Further, as mentioned above, the system 100 may include the one or more image sensors 132A. The image sensors 132A may obtain one or more images during the speech by the respondent 126. The controller 114 may be configured to receive the one or more images from the image sensors 132A and determine at least one of: an identity of the querier 128, and an identification of an object captured in the one or more images. For example, object recognition may be performed using the ML model 118 or using data pre-stored in the data storage 122, to determine the identity of the objects captured in the one or more images. Further, the system 100 may additionally include the proximity sensor 132B, the GPS module 132C, and the momentum sensor 132D, as already explained above.

Figure 5:
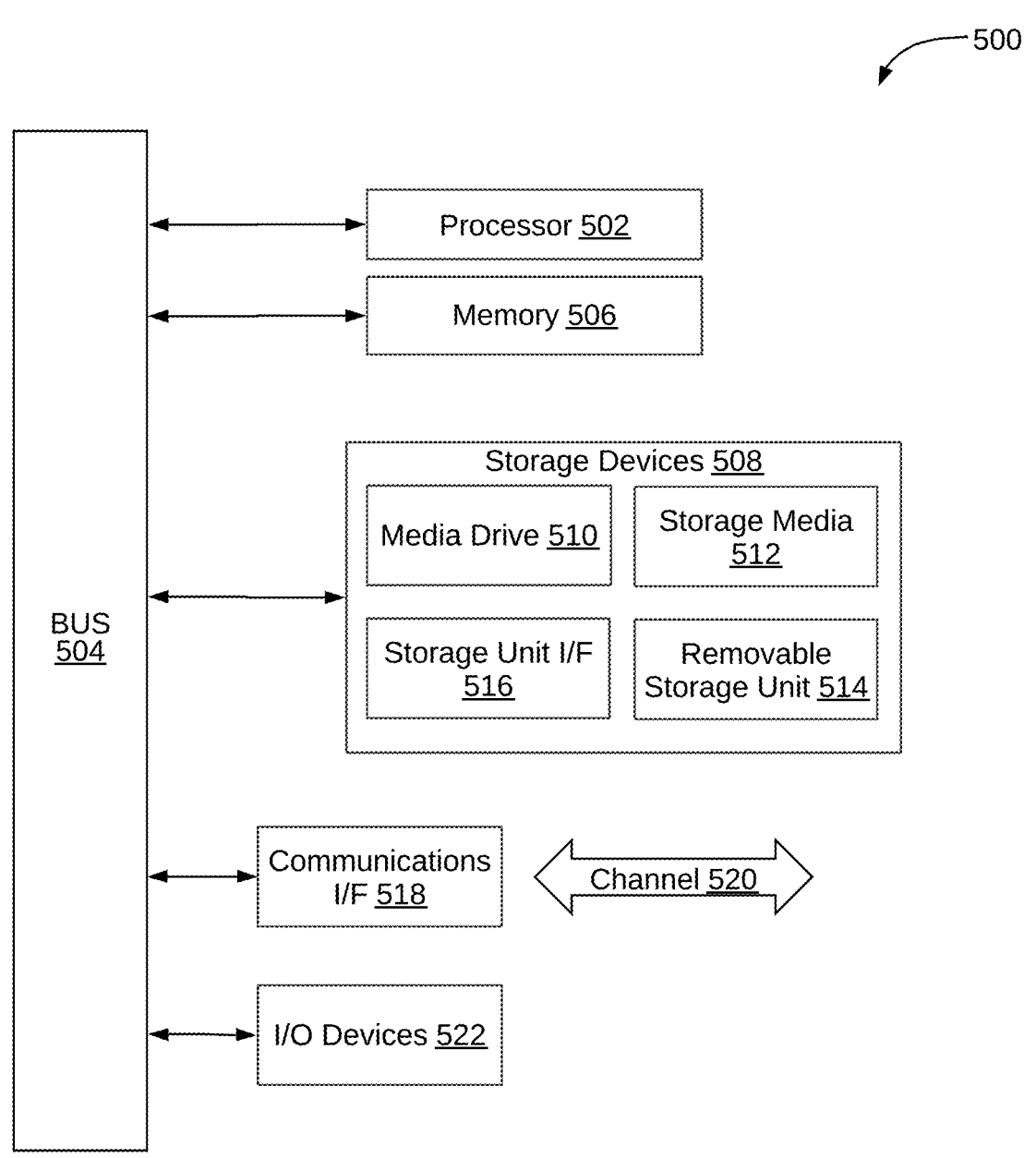
FIG. 5 is an exemplary computing system that may be employed to implement processing functionality for various embodiments.

Referring now to FIG. 5, an exemplary computing system 500 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 500 may represent, for example, a user device such as a desktop, a laptop, a mobile phone, personal entertainment device, DVR, and so on, or any other type of special or general-purpose computing device as may be desirable or appropriate for a given application or environment. The computing system 500 may include one or more processors, such as a processor 502 that may be implemented using a general or special purpose processing engine such as, for example, a microprocessor, microcontroller, or other control logic. In this example, the processor 502 is connected to a bus 504 or other communication media. In some embodiments, the processor 502 may be an Artificial Intelligence (AI) processor, which may be implemented as a Tensor Processing Unit (TPU), or a graphical processor unit, or a custom programmable solution Field-Programmable Gate Array (FPGA).

The computing system 500 may also include a memory 506 (main memory), for example, Random Access Memory (RAM) or other dynamic memory, for storing information and instructions to be executed by the processor 502. The memory 506 also may be used for storing temporary variables or other intermediate information during the execution of instructions to be executed by processor 502. The computing system 500 may likewise include a read-only memory ("ROM") or other static storage device coupled to bus 504 for storing static information and instructions for the processor 502.

The computing system 500 may also include storage devices 508, which may include, for example, a media drive 510 and a removable storage interface. The media drive 510 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 512 may include, for example, a hard disk, magnetic tape, flash drive, or other fixed or removable media that is read by and written to by the media drive 510. As these examples illustrate, the storage media 512 may include a computer-readable storage medium having stored therein particular computer software or data.

In alternative embodiments, the storage devices 508 may include other similar instrumentalities for allowing computer programs or other instructions or data to be loaded into the computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from the removable storage unit 514 to the computing system 500.

The computing system 500 may also include a communications interface 518. The communications interface 518 may be used to allow software and data to be transferred between the computing system 500 and external devices. Examples of the communications interface 518 may include a network interface (such as an Ethernet or other NIC card), a communications port (such as for example, a USB port, a micro-USB port), Near field Communication (NFC), etc. Software and data transferred via the communications interface 518 are in the form of signals which may be electronic, electromagnetic, optical, or other signals capable of being received by the communications interface 518. These signals are provided to the communications interface 518 via a channel 520. The channel 520 may carry signals and may be implemented using a wireless medium, wire or cable, fiber optics, or other communications medium. Some examples of the channel 520 may include a phone line, a cellular phone link, an RF link, a Bluetooth link, a network interface, a local or wide area network, and other communications channels.

The computing system 500 may further include Input/Output (I/O) devices 522. Examples may include, but are not limited to a display, keypad, microphone, audio speakers, vibrating motor, LED lights, etc. The I/O devices 522 may receive input from a user and also display an output of the computation performed by the processor 502. In this document, the terms "computer program product" and "computer-readable medium" may be used generally to refer to media such as, for example, the memory 506, the storage devices 508, the removable storage unit 514, or signal(s) on the channel 520. These and other forms of computer-readable media may be involved in providing one or more sequences of one or more instructions to the processor 502 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into the computing system 500 using, for example, the removable storage unit 514, the media drive 510 or the communications interface 518. The control logic (in this example, software instructions or computer program code), when executed by the processor 502, causes the processor 502 to perform the functions of the invention as described herein.

It is intended that the disclosure and examples be considered as exemplary only, with a true scope and spirit of disclosed embodiments being indicated by the following claims.

What is claimed is:

1. A device for assisting a respondent in a conversation between a querier and the respondent, the device comprising:

a controller communicatively coupled to a microphone, wherein the controller is configured to:

fetch a voice input from the microphone;

detect a silent period during a vocal conversation between the querier and the respondent, wherein the silent period has a duration;

compare the duration of the silent period with a threshold time period; and trigger a transmitter to transmit the voice input to a server upon detecting that the duration of the silent period is greater than the threshold time period, the server being configured to:

generate an output corresponding to the voice input received by the server, wherein the output comprises at least one token as a response to an excerpt from the voice input; and, transmit the output to a receiver; and a speaker communicatively coupled with the receiver and configured to generate a voice-based response based on the output, for assisting the respondent in responding to the conversation.

2. The device of claim 1, further comprising:

a wireless module communicatively coupled with the receiver and to a mobile device, wherein the wireless module is configured to:

receive, from the receiver, the generated output; and transmit the output to the mobile device, wherein the mobile device is configured to generate and display a text-based response based on the output for assisting the respondent in responding to the conversation.

3. The device of claim 1, wherein the device is an ear-worn device.

4. The device of claim 1, wherein the device is a stationary speaker device.

5. The device of claim 1, wherein the output is one of: a text-based output and a voice-based output.

6. The device of claim 1, wherein the output comprises at least one of:

a rephrasing of an excerpt from the vocal conversation between the querier and the respondent; and an answer to a query associated with the vocal conversation between the querier and the respondent.

7. The device of claim 1, further comprising:

an imaging device communicatively coupled to the controller, wherein the imaging device is configured to obtain at least one image during the conversation between the querier and the respondent, and wherein the controller is further configured to:

receive the at least one image from the imaging device, and determine at least one of: an identity of the querier, and an identification of an object captured in the at least one image.

8. The device of claim 1, wherein the device is communicatively coupled to a sensor configured to assist in determining gestures of a user present within a predetermined range, and generating commands for a remote device based the determined gestures.

9. A method of assisting a respondent in a conversation, the method comprising:

receiving, by a controller, a voice input from a microphone, wherein the voice input comprises an excerpt from a vocal conversation between a querier and the respondent;

detecting, by the controller, a silent period during the vocal conversation between the querier and the respondent, wherein the silent period has a duration;

comparing, by the controller, the duration of the silent period with a threshold time period;

triggering, by the controller, a transmitter to transmit the voice input to a server upon detecting that the duration of the silent period is greater than the threshold time period, wherein the server operates to:

generate an output corresponding to the voice input received by the server, wherein the output comprises at least one token as a response to the excerpt from the voice input;

receiving, by the controller, the output from the server via a receiver;

generating, by the controller, a voice-based response based on the output; and transmitting, by the controller, the voice-based response to a speaker for playing the voice-based response.

10. The method of claim 9, further comprising:

generating, by the controller, a text-based response based on the output for assisting the respondent in responding to the conversation; and transmitting, by the controller, the text-based response to a mobile device, via a wireless module, wherein the mobile device is configured to display the text-based response for assisting the respondent in responding to the conversation.

11. The method of claim 9, wherein the output is one of: a text-based output and a voice-based output.

12. The method of claim 9, wherein the output comprises at least one of:

a rephrasing of the excerpt from the vocal conversation between the querier and the respondent; and an answer to a query associated with the vocal conversation between the querier and the respondent.

13. The method of claim 9, further comprising:

receiving, by the controller, at least one image from an imaging device, wherein the imaging device operates to obtain the at least one image during the conversation between the querier and the respondent; and determining, by the controller, at least one of: an identity of the querier and an identification of an object captured in the at least one image.

14. The method of claim 8, the voice input is processed by a device communicatively coupled to the controller, wherein the device operates to reduce or exclude ambient noise from the voice input.

15. A method of generating voice-assistance for a respondent, the method comprising:

receiving, by a controller, a voice input from a microphone, wherein the voice input comprises an excerpt from a speech by the respondent;

detecting, by the controller, a silent period based on the voice input, wherein the silent period has a duration;

comparing, by the controller, the duration of the silent period with a threshold time period;

triggering, by the controller, a transmitter to transmit the voice input to a server upon detecting that the duration of the silent period is greater than the threshold time period, wherein the server operates to generate an output corresponding to the voice input received by the server, wherein the output comprises at least one token as a response to the excerpt from the speech in the voice input;

receiving, by the controller, the output from the server;

generating, by the controller, a voice-based response based on the output; and transmitting, by the controller, the voice-based response to a speaker for playing the voice-based response.

16. The method of claim 15, further comprising:

generating, by the controller, a text-based response based on the output; and transmitting, by the controller, the text-based response to a mobile device, via a wireless module, wherein the mobile device is configured to display the text-based response for providing voice-assistance to the respondent.

17. The method of claim 15, wherein the output is one of: a text-based output and a voice-based output.

18. The method of claim 15, wherein the output comprises an answer to a query associated with the speech by the respondent.

19. The method of claim 15, further comprising:

receiving, by the controller, at least one image from an imaging device, wherein the imaging device operates to obtain the at least one image during the speech by the respondent; and determining, by the controller, at least one of: an identity of the querier and an identification of an object captured in the at least one image.

20. The method of claim 15, the voice input is processed by a device communicatively coupled to the controller, wherein the device operates to reduce or exclude ambient noise from the voice input.

* * * * *